Jan. 8, 1957 R. W. BULL 2,777,056

REFLEX CIRCUIT AMPLIFYING INTERMEDIATE AND DETECTED VIDEO FREQUENCIES IN SAME STAGE

Filed Dec. 2, 1954

INVENTOR.
RICHARD W. BULL

BY

Ostrolenk & Faber

ATTORNEYS

United States Patent Office 2,777,056

Patented Jan. 8, 1957

2,777,056

REFLEX CIRCUIT FOR AMPLIFYING INTERMEDIATE AND DETECTED VIDEO FREQUENCIES IN SAME STAGE

Richard W. Bull, South Pasadena, Calif., assignor to Standard Coil Products Co., Inc., Los Angeles, Calif., a corporation of Illinois Application December 2, 1954, Serial No. 472,677

3 Claims. (Cl. 250—20)

The present invention relates to amplifiers and more particularly to intermediate frequency amplifiers for use in television receivers.

Up to the present time, it was a common procedure to use for the video signals an I. F. amplifier or stages of I. F. amplification followed by a video detector, the output of which was connected to a video amplifier having the function of amplifying the detected signals appearing at the output of the video detector. In the simplest possible circuits, this meant the use of at least one intermediate frequency amplifier stage, the detecting stage and one or more video amplifier stages. The minimum circuit thus required one tube for the I. F. stage, one tube or crystal for the detecting stage, and still another tube for the video amplifier stage. This circuit provided a gain not only at the intermediate frequency but also for the detected video signal.

Since then, because of a highly competitive market in the televison receiver field, manufacturers have attempted to cut down as much as possible the production cost of television receivers. This was accomplished partly by a reduction in the price of components such as tubes and partly through the reduction of some circuits while improvements were made in other circuits to compensate for the loss of these first mentioned circuits.

The present invention contemplates an I. F. amplifier, detector and video amplifier of lower costs than those manufactured up to now.

Accordingly, one object of the present invention is a provision of means for reducing the cost of television circuitry.

In the present invention, only one tube is used as the amplifying device in addition to a detecting diode or crystal.

Accordingly, still another object of the present invention is the provision of means whereby an I. F. amplifier, detector and video amplifier use only a single amplifying element.

This invention may be described by the statement that the I. F. amplifier tube operates also as the video amplifier tube, this being made possible by the considerable separation in frequencies between the intermediate frequency, generally at 41 megacycles, and the video signal frequencies, generally not higher than 5 megacycles. In fact, the intermediate frequency signals coming from either prior stages of I. F. amplification or, in a limited case, from the television tuner are applied to an I. F. transformer and thence to an amplifying tube.

The output of the amplifier also at intermediate frequencies is mutally coupled to a detecting diode or crystal. The filtered video signal is then applied back into the grid of the amplifying tube so that it appears properly amplified at the output of this amplifying tube and can now be coupled through an RC network to utilization circuits of the video frequency signal.

It should be noted that because of the considerable difference in frequency between the intermediate frequency signal and the video signal while the intermediate frequency signal is coupled from one stage to the next by mutual coupling, the video signal is coupled either directly or by RC coupling. The two signals will not interfere since the circuits tuned to one signal, in particular the intermediate frequency signal, will not couple the video signals.

Accordingly, still another object of the present invention is the provision of means whereby an intermediate frequency amplifier and the video detector can be made to have a gain ten times higher than circuits developed up to now without adding any additional components.

The foregoing and many other objects of the invention will become apparent in the following description and drawings in which.

Figure 1:
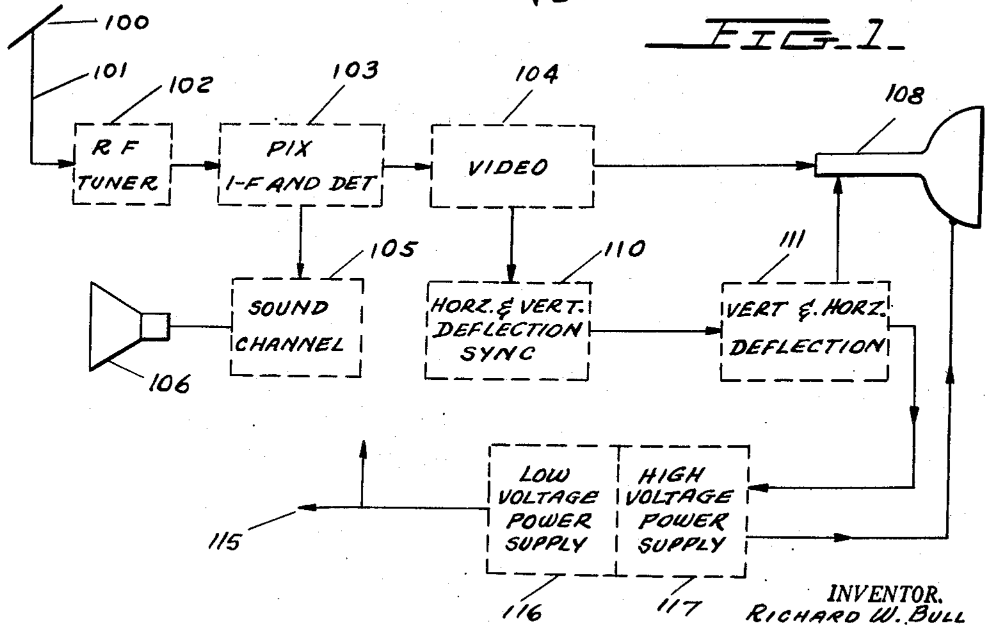
Figure 1 is a block diagram of a television receiver to which the circuit of the present invention is applicable.

Referring first to Figure 1 showing a block diagram of a television receiver, the television signals are picked up by antenna 100, are transmitted through transmission line 101 to the input of the radio frequency of television tuner 102. The output of tuner 102 goes into the picture and sound intermediate frequency and detector stage 103.

At the output of section 103, the signals have been separated into two, the video signal which goes into the video amplifier 104 and the sound signal which goes into the sound channel amplifier 105. At the output of sound channel amplifier 105 is a loud speaker 106. Video amplifier 104 is provided with two outputs, one to the picture tube 108 and the other to the horizontal and vertical deflection synchronizing circuit 110 which goes into the vertical and horizontal deflection amplifiers 111 to scan the picture tube 108 in a manner well known in the art.

The 60 cycle signal is applied at 115 and is transformed by the low voltage power supply 116 and the high voltage power supply 117 into the appropriate operating voltages for the picture tube 108 and the various tubes used in this television receiver.

Figure 2:
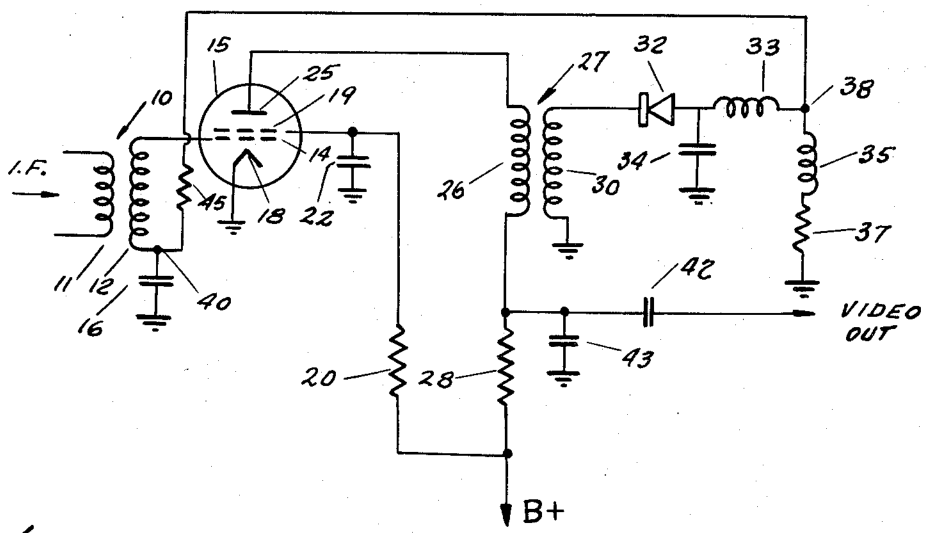
Figure 2 shows one embodiment of the I. F. amplifier and video detector stages of the present invention.

The present invention resides in an improvement of the picture and sound I. F. and detector stage 103. This novel circuit is shown in Figure 2 where transformer 10 is an intermediate frequency transformer and is, therefore, tuned to the intermediate frequency which may, for example, be 41 megacycles. The intermediate frequency signals from either previous stage of I. F. amplification or from a television tuner are applied to the primary winding 11 of the I. F. transformer 10. The secondary winding 12 in the input circuit of electron tube 15 is connected to a capacitance 16 which in turn is connected to ground. Cathode 18 of tube 15 is also grounded while screen grid 19 of tube 15 is connected to a dropping resistor 20 and thence to the B+ supply. Screen grid 19 is by-passed to ground by capacitor 22. Plate 25 of tube 15 is connected to the B+ supply through the primary winding 26 of the second I. F. transformer 27 and a resistor 28 is connected in series with the primary winding 26 of the transformer 27. Secondary winding 30 of transformer 27 is connected on one side to ground and on the other to a diode 32. The output circuit of the diode consists of a series inductance 33 and a shunt capacitor 34. A second inductance 35 is connected to inductance 33 and to ground through the resistor 37. The junction point between inductance 33 and inductance 35 will be referred to by numeral 38.

The video signal detected by diode 32 thus appears between junction point 38 and ground. Up to this point, the function of this circuit has been the following. Tube 15 with the I. F. transformers 10 and 27 has amplified the I. F. signals. Detector 32 has detected the video signals from the I. F. signals. These video signals appear now as mentioned above between junction point 38 and ground.

The basic feature of the present invention is a connection between the junction point 38 and the high side of capacitor 16 through a suitable isolation resistor 45, that is, to the junction point 40 between capacitor 16 and secondary winding 12 of I. F. transformer 10. Since secondary 12 of I. F. transformer 10 is tuned to the I. F. frequency, that is, 41 megacycles, it will present practically no impedance to the video signal which is no higher than 5 megacycles.

Thus, tube 15 now has also an input signal which is in the video frequency range, that is, up to 5 megacycles. Tube 15 now amplifies also the video signal which appears appropriately amplified across the resistor 28 since the impedance presented by the primary winding 26 of I. F. transformer 27 is also negligible since primary 26 is also tuned to the intermediate frequency.

The amplified video signal is obtained from resistor 28 by a coupling capacitor 42. Another capacitor 43, connected between the junction point of capacitor 32 and resistor 28 on one side and to ground on the other side, serves to by-pass to ground signals having a frequency higher than that of the video signals, namely, of I. F.

It will thus be noted that amplider tube 15 operates also as a video amplifier so that additional gain at video frequency is obtained without the need of an additional tube. In fact, the present novel circuit uses essentially the same number of components as prior I. F. amplifier video detector circuits, but its output video signal has a gain which may be ten times or more than the gain of presently known I. F. amplifier video detector circuits.

As is well known in the art, connected to the coupling capacitor 42 are utilization circuits for the video signal such as addiitonal video amplifiers of a television receiver.

To summarize the above, in the circuit of the present invention, the I. F. signal is first amplified by an amplifying tube detected by a diode detector or crystal and the detected video signal is then applied back into the input of the first mentioned amplifier tube so that at the output of this tube it is possible to obtain the video signal of higher amplitude than the one appearing directly at the output of the diode detector.

In an actual physical embodiment of this I. F. amplifier detector, the following component values were used:

| | | |
|---|---|---|
| Capacitor **16** | micromicrofarads | 20 |
| Resistor **20** | ohms | 3900 |
| Capacitor **22** | microfarads | .01 |
| Resistor **28** | ohms | 2000 |
| Capacitor **34** | micromicrofarads | 10 |
| Resistor **37** | ohms | 3900 |
| Capacitor **42** | micromicrofarads | 0.1 |
| Capacitor **43** | do | 20 |
| Resistor **45** | ohms | 4700 |

In the foregoing I have described my invention solely in connection with specific illustrative embodiments thereof. Since many variations and modifications of the invention will now be obvious to those skilled in the art, I prefer to be bound not by the specific disclosures herein contained but only by the appended claims.

I claim:

1. In a television receiver, an electron tube, including a plate, an input circuit for said tube comprising a transformer tuned to the I. F. frequency of said television receiver, said transformer comprising a primary and secondary, an output circuit for said tube including a plate inductance tuned to said I. F. signal frequency, a detector stage connected in said output circuit for detecting the output signal from said amplifier tube comprising a signal detector and a series inductance and shunt capacitor connected from a point between said signal detector and series inductance to ground, a second inductance connected to the output of said series inductance and connected to ground and a coupling circuit extending from the junction point of said series and second inductance to said intput inductance of said tube for impressing detected signals to the input of said tube, and a resistor connected in series with said plate inductance in the output circuit of said tube across which said amplified detected signals appear.

2. In a television receiver, an electron tube, including a plate, an input circuit for said tube comprising a transformer tuned to the I. F. frequency of said television receiver, a grounded capacitance connected in series with the secondary of said transformer, an output circuit for said tube connected to the plate thereof and including a plate inductance tuned to said I. F. signal frequency, a detector stage connected in said output circuit for detecting the output signal from said amplifier tube comprising a signal detector and a series inductance, a second inductance connected to the output of said series inductance, and a coupling circuit including an isolation resistor extending from the junction point of said series and second inductance to the junction of said series capacitance and said input inductance of said tube for impressing detected signals to the input of said tube, and a resistor connected in series with said plate inductance in the output circuit of said tube across which said amplified detected signals appear.

3. In a television receiver, an electron tube, having a plate, an input circuit for said tube comprising a transformer tuned to the I. F. frequency of said television receiver a series capacitance connected in series with the secondary of said transformer connected to ground, an output circuit for said tube connected to the plate thereof and including a plate inductance tuned to said I. F. signal frequency, a detector stage connected in said output circuit for detecting the output signal from said amplifier tube comprising a signal detector and a series inductance, a second inductance connected to the output of said series inductance, and a coupling circuit including an isolation resistor extending from the junction point of said series and second inductance to the junction of said series capacitance and said input inductance of said tube for impressing detected signals to the input of said tube, a resistor connected in series with said plate inductance in the output circuit of said tube across which said amplified detected signals appear, and a coupling circuit from said last mentioned resistor to a receiver circuit for said detected signals.

References Cited in the file of this patent

UNITED STATES PATENTS

| | | |
|---|---|---|
| 1,087,892 | Schloemilch et al. | Feb. 17, 1914 |
| 1,735,185 | Schaffer | Nov. 12, 1929 |
| 2,205,243 | Dome | June 18, 1940 |

FOREIGN PATENTS

| | | |
|---|---|---|
| 155,091 | Germany | May 15, 1938 |